(12) United States Patent
Li et al.

(10) Patent No.: US 9,990,923 B2
(45) Date of Patent: Jun. 5, 2018

(54) AUTOMATED SOFTWARE EXECUTION USING INTELLIGENT SPEECH RECOGNITION

(71) Applicant: FMR LLC, Boston, MA (US)

(72) Inventors: Pu Li, Dalian (CN); Yu Zhang, Dalian (CN); Jianhua Sun, Dalian (CN)

(73) Assignee: FMR LLC, Boston, MA (US)

( * ) Notice: Subject to any disclaimer, the term of this patent is extended or adjusted under 35 U.S.C. 154(b) by 0 days. days.

(21) Appl. No.: 15/294,476

(22) Filed: Oct. 14, 2016

(65) Prior Publication Data

US 2018/0090142 A1  Mar. 29, 2018

(30) Foreign Application Priority Data

Sep. 27, 2016 (CN) .......................... 2016 1 0861893

(51) Int. Cl.
| | |
|---|---|
| *G10L 15/26* | (2006.01) |
| *G10L 15/22* | (2006.01) |
| *H04M 3/51* | (2006.01) |
| *G10L 15/08* | (2006.01) |
| *G10L 15/30* | (2013.01) |
| *G06F 17/27* | (2006.01) |
| *G10L 25/51* | (2013.01) |

(52) U.S. Cl.
CPC ............ *G10L 15/22* (2013.01); *G06F 17/274* (2013.01); *G10L 15/08* (2013.01); *G10L 15/30* (2013.01); *G10L 25/51* (2013.01); *H04M 3/5166* (2013.01); *G10L 2015/088* (2013.01); *G10L 2015/223* (2013.01); *H04M 2201/40* (2013.01); *H04M 2201/42* (2013.01); *H04M 2201/60* (2013.01)

(58) Field of Classification Search
CPC ................................ G10L 15/22; G10L 15/08
USPC ...................................................... 704/235, 9
See application file for complete search history.

(56) References Cited

U.S. PATENT DOCUMENTS

| | | | |
|---|---|---|---|
| 7,058,565 B2 | 6/2006 | Gusler et al. | |
| 7,103,553 B2 | 9/2006 | Applebaum et al. | |
| 8,315,849 B1 * | 11/2012 | Gattani .................. | G06F 17/28 704/10 |
| 8,811,593 B1 | 8/2014 | Morrissey | |
| 9,191,476 B1 | 11/2015 | Givoly | |
| 2002/0116174 A1 * | 8/2002 | Lee .................. | G06F 17/30707 704/9 |

(Continued)

*Primary Examiner* — Jakieda Jackson
(74) *Attorney, Agent, or Firm* — Proskauer Rose LLP (57) ABSTRACT

Methods and apparatuses are described for automated execution of computer software using intelligent speech recognition techniques. A server captures a digitized voice segment from a remote device, the first digitized voice segment corresponding to speech submitted by a user of the remote device during a voice call. The server analyzes the digitized voice segment to convert the digitized voice segment into text and extract a set of keywords from the converted text. A client computing device displays the extracted keywords in a user interface of a display device. The server determines one or more computer software applications accessible to the client computing device and selects least one of the computer software applications that include functionality responsive to the keywords. The client computing device executes the functionality of the selected computer software applications that is responsive to the keywords.

20 Claims, 7 Drawing Sheets

(56) References Cited

U.S. PATENT DOCUMENTS

| | | | |
|---|---|---|---|
| 2008/0059187 A1* | 3/2008 | Roitblat | G06F 17/30684 |
| | | | 704/257 |
| 2008/0059190 A1* | 3/2008 | Chu | G10L 13/06 |
| | | | 704/258 |
| 2009/0048841 A1* | 2/2009 | Pollet | G10L 13/07 |
| | | | 704/260 |
| 2014/0177820 A1 | 6/2014 | Odinak | |
| 2016/0133146 A1* | 5/2016 | Bak | G09B 7/00 |
| | | | 434/322 |

* cited by examiner

```
from numpy import *
import operator
from os import listdir def SolutionMatch(words, valuepath, keywordpath):
    inX, columns = instr2vector(words,keywordpath)
    dataSet,labels = file2matrix(valuepath, columns)
    outlabel = KNN(inX,dataSet,labels,1)
    return outlabel def KNN(inX, dataSet, labels, k):
    dataSetSize = dataSet.shape[0]
    diffMat = tile(inX, (dataSetSize,1)) - dataSet
    sqDiffMat = diffMat**2
    sqDistances = sqDiffMat.sum(axis=1)
    distances = sqDistances**0.5
    sortedDistIndicies = distances.argsort()
    classCount={}
    for i in range(k):
        voteIlabel = labels[sortedDistIndicies[i]]
        classCount[voteIlabel] = classCount.get(voteIlabel,0) + 1
    sortedClassCount = sorted(classCount.iteritems(), key=operator.itemgetter(1), reverse=True)
    return sortedClassCount[0][0]

def file2matrix(filename, columns):
    fr = open(filename)
    numberOfLines = len(fr.readlines())         #get the number of lines in the file
    returnMat = zeros((numberOfLines, columns))   #prepare matrix to return
    classLabelVector = []                        #prepare labels return
    fr = open(filename)
    index = 0
    for line in fr.readlines():
        line = line.strip()
        listFromLine = line.split('\t')
        returnMat[index,:] = listFromLine[0:columns]
        classLabelVector.append(str(listFromLine[-1]))
        index += 1
    return returnMat,classLabelVector def instr2vector(string,keywordsfile, columns):
def instr2vector(string, keywordsfile):
    fr1 = open(keywordsfile)
    for line1 in fr1.readlines():
        line1 = line1.strip()
        KeywordVec = line1.split('\t')
        columns = len(KeywordVec)
    instr = string.split()
    outvector = zeros(columns)
    n = len(instr)
    a = n
    for i in range(columns):
        if KeywordVec[i] in instr:
            s = instr.index(KeywordVec[i])
            outvector[i] = n-s+1/a
    return outvector, columns
```

Address Update

Select All

☑ 26503 Shell Pay Deferral Investment Fund    USCG HAMILTON, FPO, AE 09542

☐ 26501 Shell Trading Savings Plan    USCG HAMILTON, FPO, AE 09542

☐ 26502 Shell Provident Fund    2 DESTINY WAY #2, WESTLAKE, TX 76262

Name: FERGUSON, ALDEN
Street1: USCG HAMILTON
Street2:
Street3:
City: FPO
State / ZIP: AE   09542 -
Foreign Country:

☐ Permanent Legal Address
☑ Create Confirm Letters
☐ Foreign/Special Address
*Valid Address Exists*

Changed On 06/20/2013
PSG, by Phone

[Accept] [Cancel]

AUTOMATED SOFTWARE EXECUTION USING INTELLIGENT SPEECH RECOGNITION

CROSS REFERENCE TO RELATED APPLICATION

This application claims priority to corresponding Chinese Patent Application No. 201610861893.8, filed on Sep. 27, 2016, the entirety of which is incorporated herein by reference.

TECHNICAL FIELD

This application relates generally to methods and apparatuses, including computer program products, for automated execution of computer software using intelligent speech recognition techniques.

BACKGROUND

Typically, customer service agents in environments such as call centers have a computer workstation that acts as a hub for a multitude of software applications (e.g., telephony, email, knowledge base, customer relationship management, sales/order processing, marketing, inventory management, and so forth) that enable the agent to effectively respond to digital communications from a customer base. When a customer initiates a communication to the call center (for example, a phone call), a network of computing devices often receives the communication and attempts to determine the underlying reason for the customer's communication (e.g., via interactive voice response (IVR) technology) in order to route the communication to an agent that may be better equipped or experienced to handle the communication.

However, this type of technology is frequently inefficient (i.e., fails to accurately capture the precise reason for the customer's communication). Current technology is also inflexible in that a customer's initial communication may reflect a specific inquiry or topic, but as the communication proceeds with a customer service agent, the customer may have additional inquiries that the system is unable to dynamically handle or requires the customer service agent to manually determine another set of computer software functionality that is required to handle the inquiry, thereby leading to longer call times, inefficiencies, and delay.

SUMMARY

The invention, in one aspect, features a method for automated execution of computer software using intelligent speech recognition techniques. A server computing device captures a digitized voice segment from a remote device, the first digitized voice segment corresponding to speech submitted by a user of the remote device during a voice call. The server computing device analyzes the digitized voice segment to convert the digitized voice segment into text and extract a set of keywords from the converted text. A client computing device coupled to the server computing device displays the extracted keywords in a user interface of a display device. The server computing device determines one or more computer software applications accessible to the client computing device. The server computing device selects at least one of the computer software applications that include functionality responsive to the keywords. The client computing device executes the functionality of the selected computer software applications that is responsive to the keywords.

The invention, in another aspect, features a system for automated execution of computer software using intelligent speech recognition techniques. The system comprises a server computing device and a client computing device. The server computing device captures a digitized voice segment from a remote device, the first digitized voice segment corresponding to speech submitted by a user of the remote device during a voice call. The server computing device analyzes the digitized voice segment to convert the digitized voice segment into text and extract a set of keywords from the converted text. A client computing device coupled to the server computing device displays the extracted keywords in a user interface of a display device. The server computing device determines one or more computer software applications accessible to the client computing device. The server computing device selects at least one of the computer software applications that include functionality responsive to the keywords. The client computing device executes the functionality of the selected computer software applications that is responsive to the keywords.

The invention, in another aspect, features a computer program product, tangibly embodied in a non-transitory computer readable storage device, for automated execution of computer software using intelligent speech recognition techniques. The computer program product includes instruction operable to cause a server computing device to capture a digitized voice segment from a remote device, the first digitized voice segment corresponding to speech submitted by a user of the remote device during a voice call. The computer program product includes instruction operable to cause the server computing device to analyze the digitized voice segment to convert the digitized voice segment into text and extract a set of keywords from the converted text. The computer program product includes instruction operable to cause a client computing device coupled to the server computing device to display the extracted keywords in a user interface of a display device. The computer program product includes instruction operable to cause the server computing device to determine one or more computer software applications accessible to the client computing device. The computer program product includes instruction operable to cause the server computing device to select at least one of the computer software applications that include functionality responsive to the keywords. The computer program product includes instruction operable to cause the client computing device to execute the functionality of the selected computer software applications that is responsive to the keywords.

Any of the above aspects can include one or more of the following features. In some embodiments, selecting at least one of the computer software applications that includes functionality responsive to the keywords comprises generating an input vector comprising a sequence of numeric values, each value associated with a keyword and weighted according to a relative position of the keyword in the set of keywords, matching the input vector against a predefined set of vectors to determine one or more vectors that are similar to the input vector, identifying a label corresponding to each matched vector, wherein the label is associated with computer software functionality, and selecting one or more computer software applications that are associated with a most common label of the identified labels. In some embodiments, matching the input vector comprises determining a distance between the input vector and each vector in the predefined set of vectors and choosing one or more of vectors in the predefined set of vectors where the distance is within a predetermined threshold.

In some embodiments, the label is an identifier that corresponds to a computer software application. In some embodiments, the server computing device establishes a voice connection between the remote device and the client computing device before capturing the digitized voice segment. In some embodiments, the server computing device establishes a voice connection between the remote device and an interactive voice response system before capturing the digitized voice segment.

In some embodiments, the client computing device displays one or more user interface elements in the user interface that correspond to the executed functionality of the selected software applications. In some embodiments, extracting a set of keywords from the converted text comprises filtering the converted text to remove stopwords. In some embodiments, converting the digitized voice segment into text comprises executing a speech recognition engine on a digital file containing the digitized voice segment to generate the text. In some embodiments, the server computing device analyzes the text using a grammar recognition engine to validate the generated text.

Other aspects and advantages of the invention will become apparent from the following detailed description, taken in conjunction with the accompanying drawings, illustrating the principles of the invention by way of example only.

BRIEF DESCRIPTION OF THE DRAWINGS

The advantages of the invention described above, together with further advantages, may be better understood by referring to the following description taken in conjunction with the accompanying drawings. The drawings are not necessarily to scale, emphasis instead generally being placed upon illustrating the principles of the invention.

FIG. 4 is exemplary software code used to implement a KNN algorithm.

DETAILED DESCRIPTION

Figure 1:
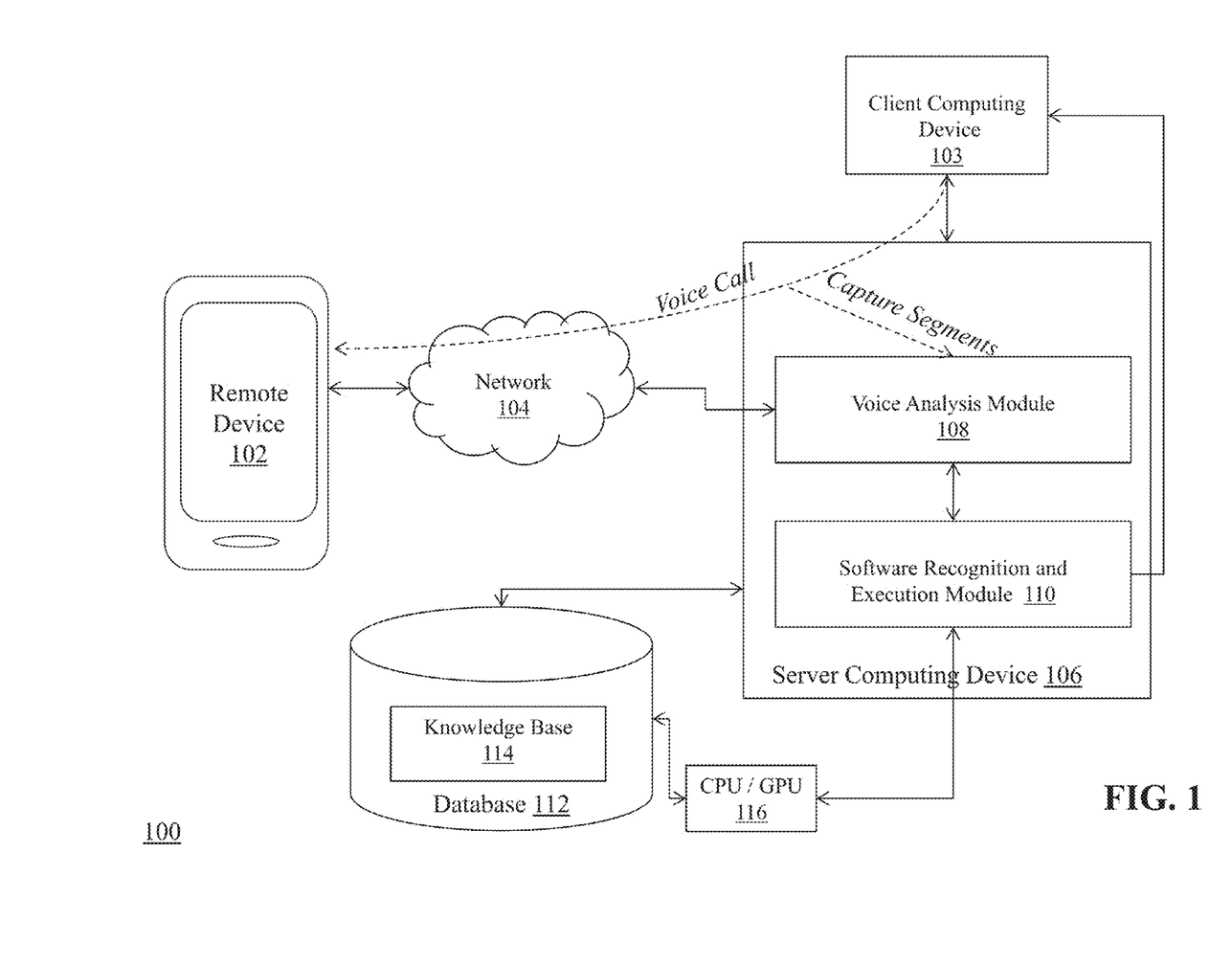
FIG. 1 is a block diagram of a system for automated execution of computer software using intelligent speech recognition techniques.

FIG. 1 is a block diagram of a system 100 for automated execution of computer software using intelligent speech recognition techniques. The system 100 includes a remote device 102, a client computing device 103, a communications network 104, a server computing device 106 that includes a voice analysis module 108 and a software recognition and execution module 110, a database 112 that includes a knowledge base 114, and a central processing unit (CPU)/graphics processing unit (GPU) hardware module 116.

The remote device 102 communicates with the server computing device 106 via the communication network 104 to establish a voice call with, e.g., client computing device 103. Example remote devices 102 can include, but are not limited to, a smart phone (e.g., Apple iPhone®, Windows®, and/or Android™-based device), a computing device with telephony software, a telephone handset, or other similar devices.

The client computing device 103 is a computing device coupled to the server computing device 106 and used to execute software applications in response to calls originating at the remote device 102. In one example, the client computing device 103 is a workstation (e.g., desktop computer) of a customer service agent in a call center that enables the agent to receive calls, access information and perform actions using software on the client device 103 to provide responses and/or solutions to inquiries posed by users on the calls. The client device 103 is capable of executing locally-stored software applications and also capable of accessing software applications delivered from the server computing device 106 (or other computing devices) via a cloud-based or software-as-a-service paradigm. The software applications can provide a wide spectrum of functionality (e.g., CRM, account, sales, inventory, ordering, information access, and the like) to the agent.

The communications network 104 enables the remote device 102 to communicate with the server computing device 106. The network 104 is typically a wide area network, such as the Internet and/or a cellular network. In some embodiments, the network 104 is comprised of several discrete networks and/or sub-networks (e.g., cellular to Internet).

The server computing device 106 a device including specialized hardware and/or software modules that execute on a processor and interact with memory modules of the server computing device 106, to receive data from other components of the system 100, transmit data to other components of the system 100, and perform functions for automated execution of computer software using intelligent speech recognition techniques as described herein. The server computing device 106 includes several computing modules 108, 110 that execute on the processor of the server computing device 106. In some embodiments, the modules 108, 110 are specialized sets of computer software instructions programmed onto one or more dedicated processors in the server computing device 106 and can include specifically-designated memory locations and/or registers for executing the specialized computer software instructions.

Although the modules 108, 110 are shown in FIG. 1 as executing within the same server computing device 106, in some embodiments the functionality of the modules 108, 110 can be distributed among a plurality of server computing devices. As shown in FIG. 1, the server computing device 106 enables the modules 108, 110 to communicate with each other in order to exchange data for the purpose of performing the described functions. It should be appreciated that any number of computing devices, arranged in a variety of architectures, resources, and configurations (e.g., cluster computing, virtual computing, cloud computing) can be used without departing from the scope of the invention. The exemplary functionality of the modules 108, 110 is described in detail below.

The database 112 is a computing device (or in some embodiments, a set of computing devices) coupled to the server computing device 106 and is configured to receive, generate, and store specific segments of data relating to the process of automated execution of computer software using intelligent speech recognition techniques as described herein. In some embodiments, all or a portion of the database 112 can be integrated with the server computing device 106 or be located on a separate computing device or devices. The database 112 can comprise one or more databases configured to store portions of data used by the other components of the system 100, as will be described in greater detail below. An exemplary database 208 is MySQL™ available from Oracle Corp. of Redwood City, Calif.

The database 112 includes a knowledge base 114 which is a dedicated section of the database 112 that contains specialized data used by the other components of the system 110 to generate and store a rule set used by the system to perform the automated execution of computer software using intelligent speech recognition techniques as described herein. Further detail on the knowledge base 114 is provided below.

The CPU/GPU hardware module 116 is a dedicated device that contains multiple processors (e.g., a CPU and a GPU) used by the server computing device 106 to process specialized data in generating and training the rule set model as will be described in greater detail below.

Figure 2:
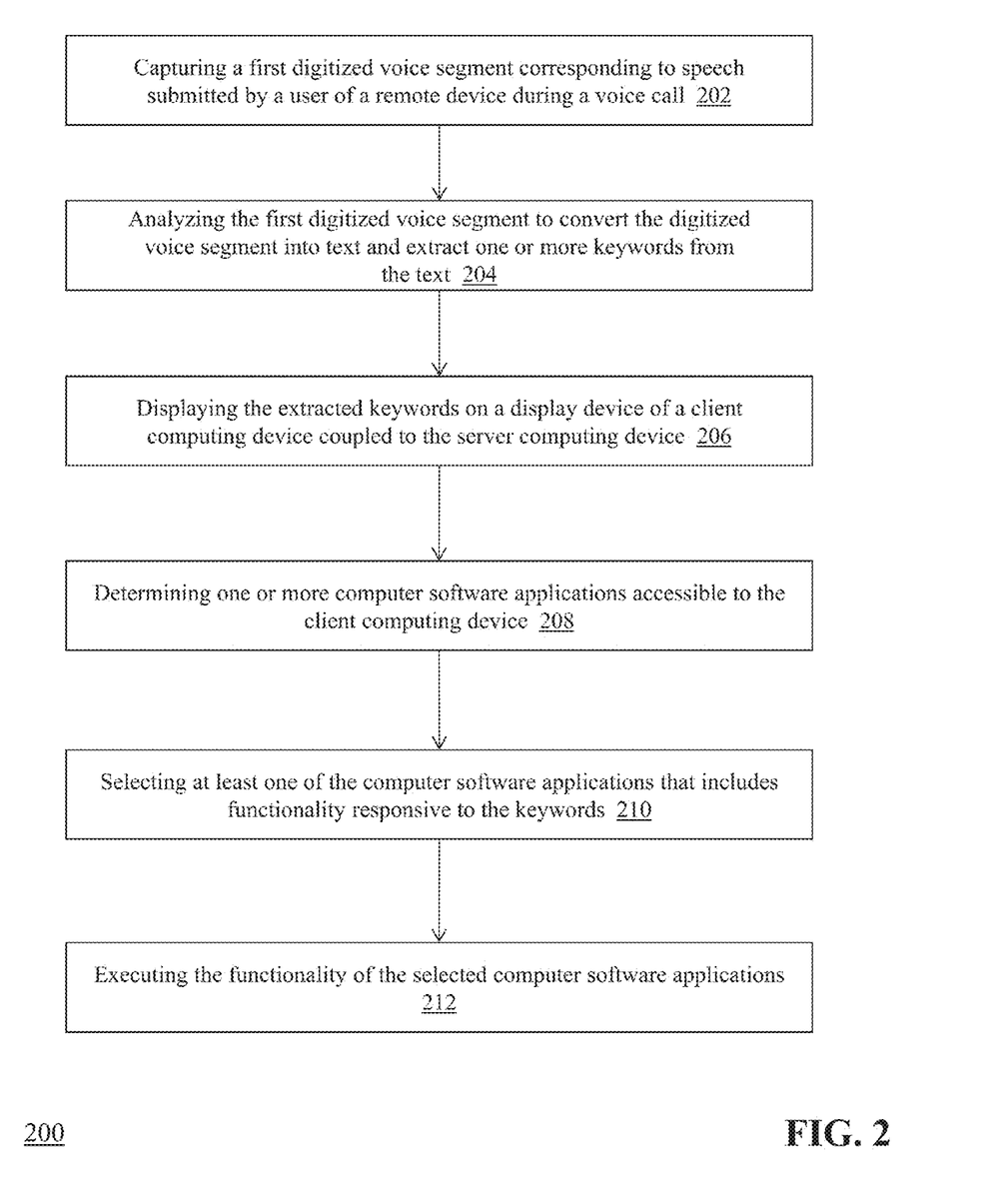
FIG. 2 is a flow diagram of a method for automated execution of computer software using intelligent speech recognition techniques.

FIG. 2 is a flow diagram of a method 200 for automated execution of computer software using intelligent speech recognition techniques, using the system 100 of FIG. 1. The remote device 102 initiates a telephone call via communications network 104 to, e.g., a call center at which the client computing device 103 (e.g., a workstation of a customer service agent) and the server computing device 106 are located. Upon receiving the voice call, the server computing device 106 identifies a client computing device 103 to which the call should be routed. The server computing device 106 routes the voice call to the client computing device 103.

As the user of the remote device 102 speaks to the agent at the client computing device 102, the voice analysis module 108 captures (202) a digitized voice segment corresponding to speech submitted by the user. For example, the user may be asking a question about certain products or services, the user may be requesting information about his or her account, or the user may be providing a complaint. In some embodiments, the voice analysis module 108 captures, e.g., a digital bitstream of the voice call and parses the bitstream to locate the speech segments associated with the customer. It should be appreciated that the voice analysis module 108 is capable of digitizing the voice segments, in the case that the segments are captured or otherwise received in non-digital form. The voice analysis module 108 can also perform functions to improve the audio quality of the digitized voice segments, such as adjusting compression, converting the segments to another format, reducing or eliminating background noise, and so forth. The voice analysis module 108 stores the captured file in database 112.

It should be appreciated that, in some embodiments, the voice analysis module 108 continuously captures digitized voice segments from the customer throughout the call and uses the voice segments in the manner described herein. For example, the voice analysis module 108 can be configured to continuously capture and measure digitized voice segments according to user-defined settings (e.g., 10-second segments, 20-second segments, 60-second segments).

The voice analysis module 108 analyzes (204) the digitized voice segment to convert the digitized voice segment into text and to extract one or more keywords from the text. The voice analysis module 108 utilizes two core functionalities to convert the voice segment into text: speech recognition and grammar analysis. In one example, the voice analysis module 108 can use a speech recognition library, such as the Speech Recognition API available from Microsoft Corporation, to convert the digitized speech file into text. In some embodiments, the voice analysis module 108 can leverage external resources, such as a grammar library accessible via the internet, in order to accurately determine the words and phrases contained within the digitized voice segment.

The voice analysis module 108 then analyzes the text generated from the digitized voice segment to extract one or more keywords from the text. The module 108 can perform techniques such as stopword removal and context-specific word filtering in order to isolate specific keywords that correlate to, e.g., the reason for the user's call or the action that the user desires from the agent. For example, if the user says "This is John Smith and I would like to update my mailing address," the voice analysis module 108 may extract keywords "update," "mailing," and "address." In some embodiments, the voice analysis module 108 can recognize specific names (e.g., John Smith) in the digitized voice segment and retrieve user-specific information based upon the names, such as automatically retrieving a specific user profile and storing the retrieved profile locally at the client computing device 103.

Figure 3:
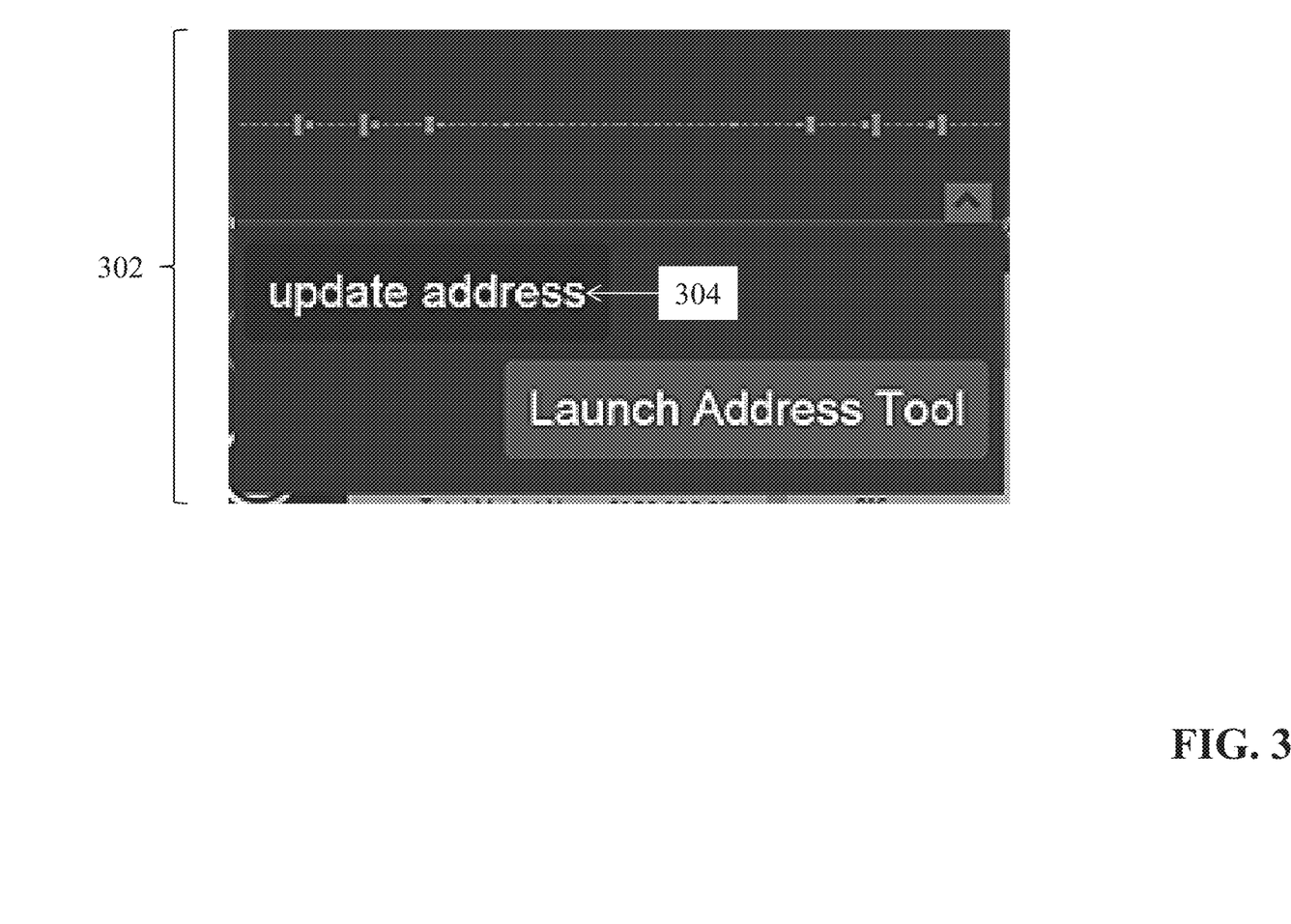
FIG. 3 is an exemplary user interface screen displaying keywords extracted from a digitized voice segment.

Upon determining the keywords, the voice analysis module 108 transmits the keywords to the client computing device 103, which displays (206) the keywords on a display device coupled to the client computing device 103. An example display is shown in FIG. 3. As shown, the client computing device 103 can generate a user interface window 302 that contains the keywords 304 recognized from the user's speech. In some embodiments, the display of keywords is dynamic in that the user interface window continually refreshes the list of keywords as the voice analysis module 108 determines the keywords throughout the call.

The voice analysis module 108 also transmits the keywords to the software recognition and execution module 110 of the server computing device 106. The software recognition and execution module 110 determines (208) one or more software applications that are accessible by the client computing device 103. For example, the client computing device 103 may have a number of software applications installed locally and/or have access to software applications at the server computing device 106 or via the communications network 104 (e.g., software-as-a-service applications, cloud-based applications, and so forth). The module 110 can retrieve the accessible software applications, e.g., from a list stored in the database 112. In some embodiments, the module 110 can scan, e.g., a registry, a file directory, and/or a process list on the client computing device 103 to determine the group of accessible software applications.

The software recognition and execution module 110 then analyzes the keywords using an intelligent solution matching paradigm to select (210), based upon the keywords, which software application(s) include functionality that can or should be executed at the client computing device 103 in order to effectively respond to the user's request or inquiry. The details of the software recognition and execution module 110 are described below.

First, the module 110 executes a natural language processing algorithm as follows in order to distinguish the underlying intent of the keywords more precisely. A bag-of-words model can be used in natural language processing, where the frequency of each keyword in a set is determined and a weight is assigned to the keyword based upon the frequency. However, the bag-of-words model does not consider the sequence of the keywords—and, in most situations, the sequence is important in determining intent, i.e., a keyword appearing first in a sequence can mean something different than a keyword appearing last, for example.

Therefore, the module 110 utilizes a sequenced bag-of-words model to account for position of keywords in the overall sequence. Let $K=\{k_1, k_2, \ldots, k_n\}$ be a set of n keywords received from the voice analysis module 108. The module 110 converts the set of keywords K into a sequenced bag-of-words model by weighting each keyword by considering the keyword's appearance in the sequence.

Let s be the sequence number of the first appearance of the keyword (e.g., 1=first, 2=second, etc.), let m be the total number of keywords in the set, let n be the frequency of the keyword appearing in the set, and let w be the weight of the keyword. The weight can be calculated as:

$$w = \frac{m-s+1}{\lambda} \times n$$

where $\lambda$ is an adjusted coefficient.

For instance, if the input set of keywords as extracted from the digitized voice segment is {what, health, savings, account} and (as an example) the total number of keywords in the corpus is ten (i.e., {what, explain, health, income, plan, savings, balance, account, enroll, withdraw}), the input set of keywords is converted into a vector—e.g., [1, 0, 0.75, 0, 0, 0.5, 0, 0.25, 0, 0]. In the above example, the adjusted coefficient $\lambda$ is set to 1/m—however, in most cases this coefficient is determined by training the dataset.

To train the dataset, a cost function is chosen. Below is an example of a cost function, where theta represents all parameters:

$$J(\theta) = \frac{1}{2}\sum_{i=1}^{m}(h_\theta(x^{(i)}) - y^{(i)})^2$$

Then, the system chooses different parameters including coefficient $\lambda$, trains the model several times, then chooses one set of parameters which has the lowest cost (lowest error).

After the software recognition and execution module 110 generates the vector based upon the input keywords, the module 110 employs a K-Nearest Neighbor (KNN) algorithm to match the vector to a knowledge base stored in database 112 that includes rules referring to one or more software applications—or specific subset(s) of functionality within one or more software applications—that when executed, offer a solution or response to the keywords. For example, the knowledge base stores the set of rules that each corresponds to a vector (as described above) and a label. The module 110 uses the KNN algorithm to determine one or more rules that are similar to the input vector, evaluates the labels corresponding to those rules, and in one embodiment, assigns the most common label among the selected rules to the input vector. FIG. 4 is exemplary software code used to implement the KNN algorithm by the software recognition and execution module 110.

Once the module 110 has assigned the label to the input vector, the module 110 determines which software application(s)—or functionality of software application(s)—corresponds to the assigned label. In some embodiments, the label is an identifier that is associated with a particular software application or function within a software application. The module 110 uses the label to retrieve an identity of the associated software application or function from, e.g., database 112. When the module 110 has identified the software application(s) that are responsive to the keywords extracted from the user's speech, the module 110 compares the identified responsive application(s) to the group of software applications previously determined to be accessible to the client computing device 103.

Figure 5:
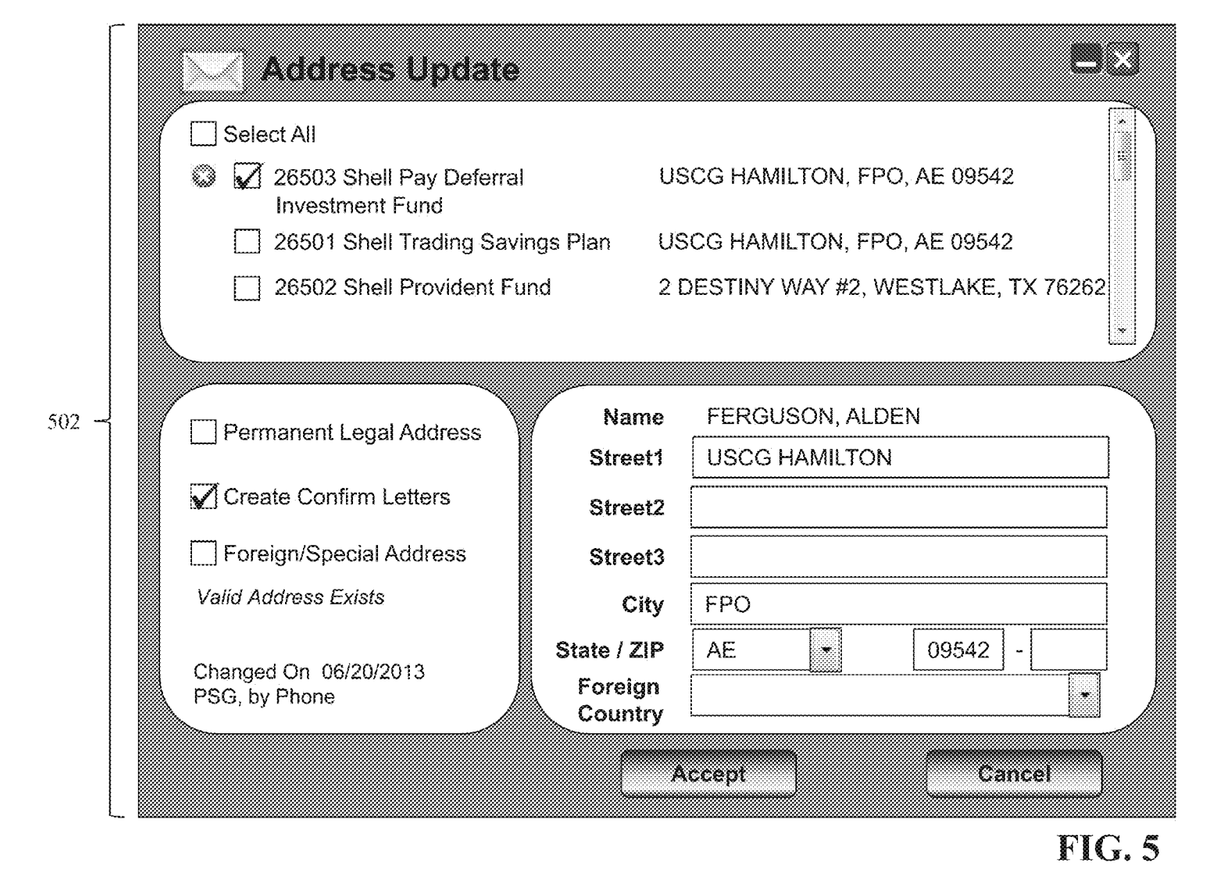
FIG. 5 is an exemplary user interface screen displaying an executed application.

Provided that at least one of the identified responsive applications is in the group of accessible software applications, the software recognition and execution module 110 transmits instructions to the client computing device 103 for execution of the appropriate software application(s). The client computing device 103 then executes (212) functionality of the selected computer software application(s) to respond to, or assist the agent to respond to, the user's inquiry. As shown in FIG. 5, an update address user interface window 502 is launched by the client computing device 103 in response to evaluation and matching of the keywords from FIG. 3. The agent can proceed to update the user's address information in response to the inquiry.

An important aspect of the techniques described herein is the generation and maintenance of the ruleset stored in the knowledge base of database 112 which contains the association of vectors and labels as described above. The methods and systems described herein advantageously utilize a self-learning knowledge base implemented on a combination central processing unit (CPU)/graphics processing unit (GPU) hardware configuration that greatly increases the speed of processing data to generate the ruleset—as described in detail below.

Figure 6:
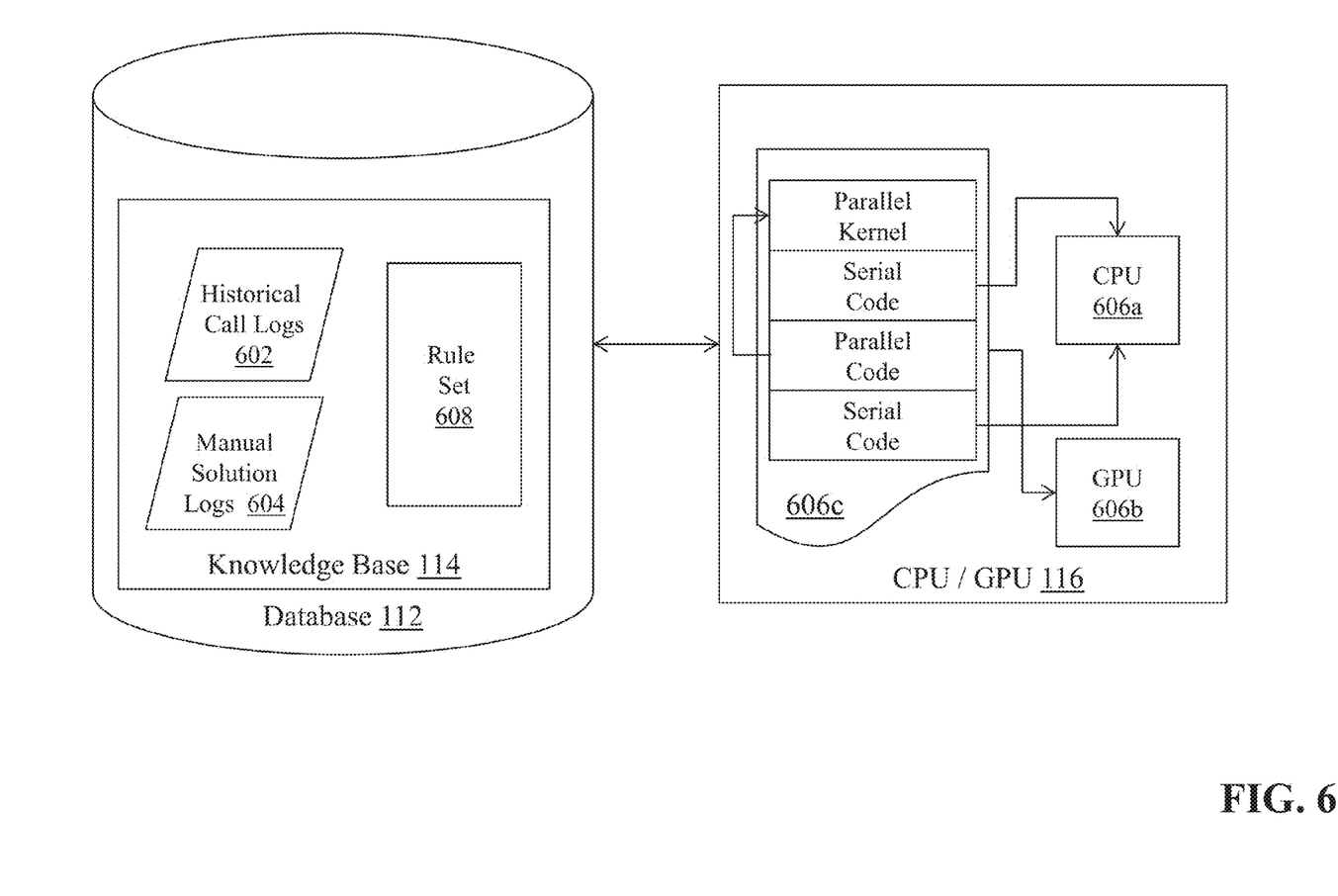
FIG. 6 is a detailed block diagram of a knowledge base and a CPU/GPU hardware module.

FIG. 6 is a detailed block diagram of the knowledge base 114 and CPU/GPU hardware module 116 of the system 100 of FIG. 1. The knowledge base 114 contains a set of historical call logs 602 that contain, e.g., text-based transcriptions of prior calls to a call center and a manual solution logs 604 that contain, e.g., recorded solutions from customer service agents, including which application(s) and/or functionality the agents used to solve a particular inquiry along with the related inquiry, along with a mapping to the applicable call log in the call logs 602. The knowledge base 114 also contains the rule set 608 (as described above), which contains the set of vectors and labels.

The CPU/GPU hardware module 116 includes a CPU 606a and a GPU 606b, which are separate hardware processors configured within one or more computing devices. As shown in FIG. 6, the processors 606a and 606b are positioned within a single computing device but other architectures and configurations are possible. The module 116 also includes application code 606c executable by either the CPU 606a or the GPU 606b that is used to process the historical call logs 602 and the manual solution logs 604 to generate the rule set 608 as will be described below.

The software recognition and extraction module 110 first converts each entry in the historical call logs 602 into a vector using the sequenced bag-of-words model described previously. For example, if $x=\{x_1, x_2, \ldots, x_n\}$ is a set of n keywords from a call log, the corpus of all call logs can be represented as $X=\{x_1, x_2, \ldots, x_m\}$.

Let $s=\{s_1, s_2, \ldots, s_l\}$ be a set of solutions (as presented in the solutions log 604), and $x_i \Rightarrow s_j$ is the known mapping between an entry in the call log 602 and an entry in the solution log 604.

Next, the CPU/GPU module 116 executes an autoencoders algorithm to find a coding matrix W and a deviation vector b. The autoencoders algorithm is a deep learning algorithm that is sued for feature extraction and dimension reduction in generating the rule set 608 model. Deep learning is the fastest growing area of machine learning. Deep learning uses neural networks to learn many levels of abstraction. The GPU 606b is ideal for training neural networks—due to the power of the GPU to perform many calculations at once or in parallel, a process that could otherwise take months now just takes weeks or days. In the CPU/GPU module 116, the GPU 606b is akin to a device host CPU. The CPU 606a performs more complex logic work and the GPU 606b performs tasks which require a high volume of computation but with simple logic. The autoencoders algorithm is described below with respect to FIG. 7.

Figure 7:
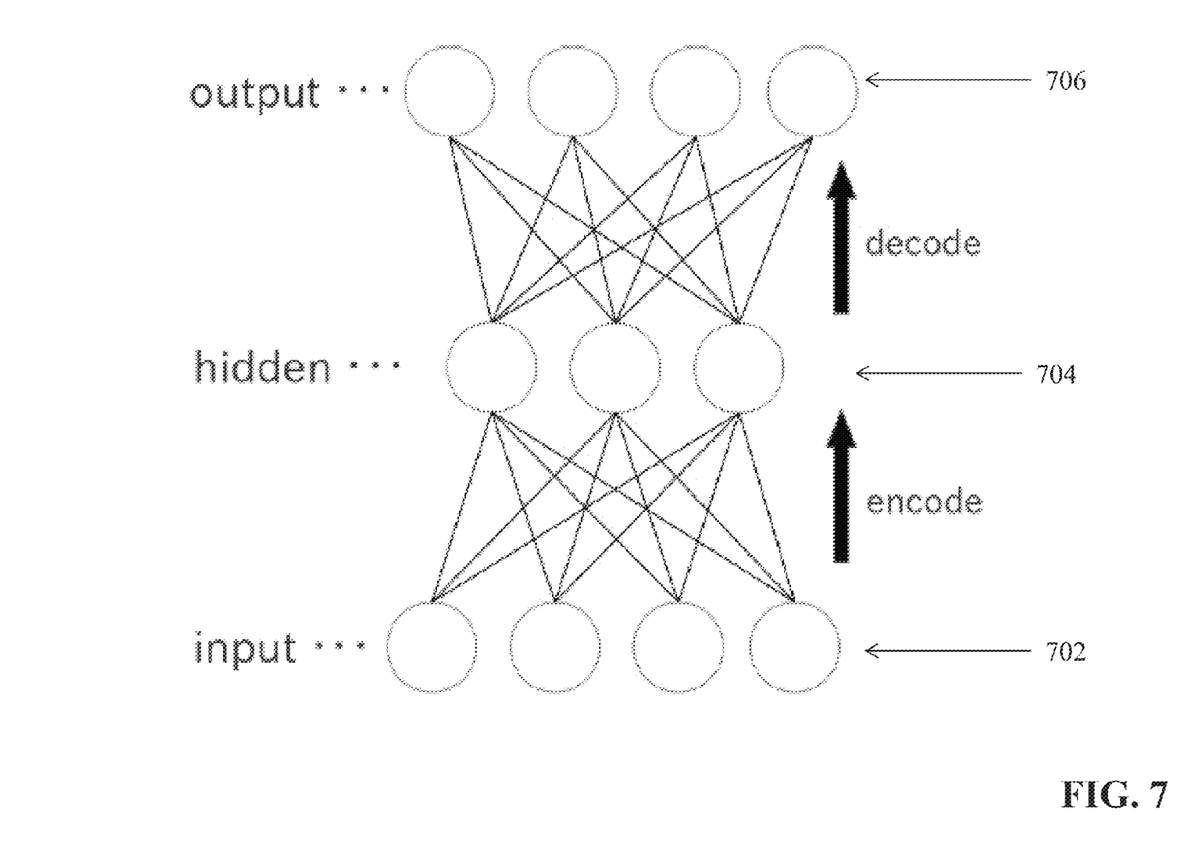
FIG. 7 is a depiction of an autoencoders algorithm used by the system.

The CPU/GPU module 116 takes as input $x \in [0, 1]^d$ (element 702 in FIG. 7) and first maps the input to a hidden representation $y \in [0, 1]^{d'}$ (element 704 in FIG. 7) through a deterministic mapping:

$$y = s(Wx+b)$$

where s is the sigmoid function $$s(t) = \frac{1}{1+e^{-t'}}$$

W is the parameter matrix, and b is the deviation vector.

Then, the module 116 decodes the latent representation y into a reconstruction z:

$$z = s(W'y+b')$$

Then the module 116 defines a cost function $$L_H(x,z) = \|x-z\|^2$$

and finds the minimal value of the cost function by using a gradient descent method:

$$\theta \leftarrow \theta - l \frac{\partial L_H(x, z)}{\partial x}$$

where $\theta$ is the collection of parameters including W, b, and b', and l is the learning rate.

By repeating this gradient, the CPU/GPU module generates the optimal collection of parameters (i.e., element 706 in FIG. 7) which has the minimal cost value. The above algorithm is based upon Theano, which is a Python library that enables the CPU/GPU module 116 to efficiently define, optimize, and evaluate mathematical expressions involving multi-dimensional arrays. Because Theano supports GPUs, the module 116 can leverage the speed of the GPU 606b to accelerate the processing of the large amount of call log and solution log data.

Next, the software recognition and extraction module 110 converts each x to x' by using the formula x'=s(Wx+b) where x' is the extracted feature which represents x but has far fewer dimensions than x.

The module 110 then executes a K-means clustering algorithm to cluster the x', choose the centroid of each cluster as one rule, and store the rule in the rule set 608 R={$r_1, r_2, \ldots, r_k$}, where $r_i = (x_i \Rightarrow s_j)$. The K-means clustering algorithm is described below.

K-means clustering provides an efficient way to classify a given data set through a certain number of clusters. As mentioned above, the module 110 uses the K-means clustering algorithm to generate the rule set 608.

First, the module 110 defines an objective function:

$$J = \sum_{j=1}^{k} \sum_{i=1}^{n} \|x_i^{(j)} - c_j\|^2$$

where $\|x_i^{(j)} - c_j\|^2$ is a chosen distance measure between a data point $x_i^{(j)}$ and the cluster center $c_j$.

The module 110 performs the following steps:

1) Place K points into a space represented by the objects that are being clustered. These points represent initial group centroids.

2) Assign each object to the group that has the closest centroid.

3) When all objects have been assigned, recalculate the positions of the K centroids.

4) Repeat steps 2 and 3 above until the centroids no longer move—producing a separation of the objects into groups from which the metric to be minimized can be calculated.

After the module 110 generates an initial rule set, the module 110 continues to process data at periodic intervals (e.g., hourly, daily, weekly) in order to generate additional rules.

Below is an exemplary use case describing how the system 100 of FIG. 1 performs automated execution of computer software using intelligent speech recognition techniques. A user at remote device 102 places a call to a customer service center in order to update the mailing address on his account. The call is routed through communications network 104 to the server computing device 106. The server computing device 106 determines that the call should be routed to a certain customer service agent (e.g., based upon the phone number that the user dialed). Upon connecting the call to the client computing device 103 of the customer service agent, the agent can ask the user what the reason is for his call. In this example, the user can respond by saying, "I need to update my mailing address." The voice analysis module 108 of the server computing device 106 can capture this speech as a digitized voice segment as described previously.

In some embodiments, the server computing device 106 can connect the remote device 102 to an IVR system or automated menu system that can automatically identify the reason for the user's call. For example, the IVR system can ask the user to provide the reason for his call and the user can respond by saying, "I need to update my mailing address." The voice analysis module 108 of the server computing device 106 can capture this speech as a digitized voice segment as described previously.

Once the voice analysis module 108 has captured the digitized voice segment, the module 108 analyzes the voice segment and converts the voice segment into the corresponding text: "I need to update my mailing address." The voice analysis module 108 then extracts the keywords "update," "mailing," "address" from the text.

The voice analysis module 108 further displays the extracted keywords on a display device coupled to the client computing device 103. For example, a user interface window appears on the display containing the keywords "update," "mailing," "address."

The software recognition and execution module 110 receives the keywords and converts the keywords into a vector as described above, then matches the input vector against the vectors in the rule set contained in the knowledge base 114 to identify a rule that is responsive to the update mailing address inquiry and retrieve a corresponding label for the rule. In this example, the module 110 retrieves a label "account_address.exe" which corresponds to the executable for an update mailing address application. It should be appreciated that the label can be any identifier that corresponds to a software application or software application function; the above is an example.

The software recognition and execution module 110 also determines a group of software applications and/or related functionality that is accessible by the client computing device 103. In this example, the account_address.exe application is a commonly-used application that is accessible by all of the client computing devices 103 used by the customer service agents. The module 110 can identify the client computing device 103 and/or agent using the device and search the database 112 to determine which application(s) the device/agent has access to.

Because the client device 103 has access to the account_address.exe application and the application is associated with the rule that responds to the inquiry, the server computing device 106 transmits instructions to the client computing device 103 to execute the account_address.exe application. The client computing device 103 executes the application, which launches a user-fillable input screen on the display of the client device. In this example, the input screen is pre-filled with address information of the user (who was previously identified automatically through a user profile stored in the database). The agent can simply obtain the new mailing address information from the user and update the user-fillable input screen to save the new information, without having to manually launch the application or determine which application is applicable to address the problem.

The above-described techniques can be implemented in digital and/or analog electronic circuitry, or in computer hardware, firmware, software, or in combinations of them. The implementation can be as a computer program product, i.e., a computer program tangibly embodied in a machine-readable storage device, for execution by, or to control the operation of, a data processing apparatus, e.g., a programmable processor, a computer, and/or multiple computers. A computer program can be written in any form of computer or programming language, including source code, compiled code, interpreted code and/or machine code, and the computer program can be deployed in any form, including as a stand-alone program or as a subroutine, element, or other unit suitable for use in a computing environment. A computer program can be deployed to be executed on one computer or on multiple computers at one or more sites. The computer program can be deployed in a cloud computing environment (e.g., Amazon® AWS, Microsoft® Azure, IBM®).

Method steps can be performed by one or more processors executing a computer program to perform functions of the invention by operating on input data and/or generating output data. Method steps can also be performed by, and an apparatus can be implemented as, special purpose logic circuitry, e.g., a FPGA (field programmable gate array), a FPAA (field-programmable analog array), a CPLD (complex programmable logic device), a PSoC (Programmable System-on-Chip), ASIP (application-specific instruction-set processor), or an ASIC (application-specific integrated circuit), or the like. Subroutines can refer to portions of the stored computer program and/or the processor, and/or the special circuitry that implement one or more functions.

Processors suitable for the execution of a computer program include, by way of example, special purpose microprocessors specifically programmed with instructions executable to perform the methods described herein, and any one or more processors of any kind of digital or analog computer. Generally, a processor receives instructions and data from a read-only memory or a random access memory or both. The essential elements of a computer are a processor for executing instructions and one or more memory devices for storing instructions and/or data. Memory devices, such as a cache, can be used to temporarily store data. Memory devices can also be used for long-term data storage. Generally, a computer also includes, or is operatively coupled to receive data from or transfer data to, or both, one or more mass storage devices for storing data, e.g., magnetic, magneto-optical disks, or optical disks. A computer can also be operatively coupled to a communications network in order to receive instructions and/or data from the network and/or to transfer instructions and/or data to the network. Computer-readable storage mediums suitable for embodying computer program instructions and data include all forms of volatile and non-volatile memory, including by way of example semiconductor memory devices, e.g., DRAM, SRAM, EPROM, EEPROM, and flash memory devices; magnetic disks, e.g., internal hard disks or removable disks; magneto-optical disks; and optical disks, e.g., CD, DVD, HD-DVD, and Blu-ray disks. The processor and the memory can be supplemented by and/or incorporated in special purpose logic circuitry.

To provide for interaction with a user, the above described techniques can be implemented on a computing device in communication with a display device, e.g., a CRT (cathode ray tube), plasma, or LCD (liquid crystal display) monitor, a mobile device display or screen, a holographic device and/or projector, for displaying information to the user and a keyboard and a pointing device, e.g., a mouse, a trackball, a touchpad, or a motion sensor, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, and/or tactile input.

The above-described techniques can be implemented in a distributed computing system that includes a back-end component. The back-end component can, for example, be a data server, a middleware component, and/or an application server. The above described techniques can be implemented in a distributed computing system that includes a front-end component. The front-end component can, for example, be a client computer having a graphical user interface, a Web browser through which a user can interact with an example implementation, and/or other graphical user interfaces for a transmitting device. The above described techniques can be implemented in a distributed computing system that includes any combination of such back-end, middleware, or front-end components.

The components of the computing system can be interconnected by transmission medium, which can include any form or medium of digital or analog data communication (e.g., a communication network). Transmission medium can include one or more packet-based networks and/or one or more circuit-based networks in any configuration. Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), Bluetooth, near field communications (NFC) network, Wi-Fi, WiMAX, general packet radio service (GPRS) network, HiperLAN), and/or other packet-based networks. Circuit-based networks can include, for example, the public switched telephone network (PSTN), a legacy private branch exchange (PBX), a wireless network (e.g., RAN, code-division multiple access (CDMA) network, time division multiple access (TDMA) network, global system for mobile communications (GSM) network), and/or other circuit-based networks.

Information transfer over transmission medium can be based on one or more communication protocols. Communication protocols can include, for example, Ethernet protocol, Internet Protocol (IP), Voice over IP (VOIP), a Peer-to-Peer (P2P) protocol, Hypertext Transfer Protocol (HTTP), Session Initiation Protocol (SIP), H.323, Media Gateway Control Protocol (MGCP), Signaling System #7 (SS7), a Global System for Mobile Communications (GSM) protocol, a Push-to-Talk (PTT) protocol, a PTT over Cellular (POC) protocol, Universal Mobile Telecommunications System (UMTS), 3GPP Long Term Evolution (LTE) and/or other communication protocols.

Devices of the computing system can include, for example, a computer, a computer with a browser device, a telephone, an IP phone, a mobile device (e.g., cellular phone, personal digital assistant (PDA) device, smart phone, tablet, laptop computer, electronic mail device), and/or other communication devices. The browser device includes, for example, a computer (e.g., desktop computer and/or laptop computer) with a World Wide Web browser (e.g., Chrome™ from Google, Inc., Microsoft® Internet Explorer® available from Microsoft Corporation, and/or Mozilla® Firefox available from Mozilla Corporation). Mobile computing device include, for example, a Blackberry® from Research in Motion, an iPhone® from Apple Corporation, and/or an Android™-based device. IP phones include, for example, a Cisco® Unified IP Phone 7985G and/or a Cisco® Unified Wireless Phone 7920 available from Cisco Systems, Inc.

Comprise, include, and/or plural forms of each are open ended and include the listed parts and can include additional parts that are not listed. And/or is open ended and includes one or more of the listed parts and combinations of the listed parts.

One skilled in the art will realize the subject matter may be embodied in other specific forms without departing from the spirit or essential characteristics thereof. The foregoing embodiments are therefore to be considered in all respects illustrative rather than limiting of the subject matter described herein.

What is claimed is:

1. A method for automated execution of computer software using intelligent speech recognition techniques, the method comprising:

capturing, by a server computing device, a bitstream containing a digitized voice segment from a remote device as a speech file, the first digitized voice segment corresponding to speech submitted by a user of the remote device during a voice call;

parsing, by the server computing device, the bitstream to locate the digitized voice segment;

adjusting, by the server computing device, compression of the bitstream containing the digitized voice segment to enhance audio quality of the bitstream;

analyzing, by the server computing device, the speech file to convert the speech file into text and extract a set of keywords from the converted text;

displaying, by a client computing device coupled to the server computing device, the extracted keywords in a user interface of a display device;

determining, by the server computing device, one or more computer software applications accessible to the client computing device;

selecting, by the server computing device, at least one of the computer software applications that include functionality responsive to the keywords, comprising:

generating an input vector comprising a sequence of numeric values, each value associated with a keyword and weighted according to a relative position of the keyword in the set of keywords, matching the input vector against a predefined set of vectors to determine one or more vectors that are similar to the input vector, identifying a label corresponding to each matched vector, wherein the label is associated with computer software functionality, and selecting one or more computer software applications that are associated with a most common label of the identified labels; and executing, by the client computing device, the functionality of the selected computer software applications that are responsive to the keywords.

2. The method of claim 1, wherein matching the input vector comprises determining, by the server computing device, a distance between the input vector and each vector in the predefined set of vectors; and choosing, by the server computing device, one or more of vectors in the predefined set of vectors where the distance is within a predetermined threshold.

3. The method of claim 1, wherein the label is an identifier that corresponds to a computer software application.

4. The method of claim 1, further comprising establishing, by the server computing device, a voice connection between the remote device and the client computing device before capturing the digitized voice segment.

5. The method of claim 1, further comprising establishing, by the server computing device, a voice connection between the remote device and an interactive voice response system before capturing the digitized voice segment.

6. The method of claim 1, further comprising displaying, by the client computing device, one or more user interface elements in the user interface that correspond to the executed functionality of the selected software applications.

7. The method of claim 1, wherein extracting a set of keywords from the converted text comprises filtering, by the server computing device, the converted text to remove stopwords.

8. The method of claim 1, wherein converting the digitized voice segment into text comprises executing, by the server computing device, a speech recognition engine on a digital file containing the digitized voice segment to generate the text.

9. The method of claim 8, further comprising analyzing, by the server computing device, the text using a grammar recognition engine to validate the generated text.

10. A system for automated execution of computer software using intelligent speech recognition techniques, the system comprising:

a server computing device configured to
capture a bitstream containing a digitized voice segment from a remote device as a speech file, the digitized voice segment corresponding to speech submitted by a user of the remote device during a voice call;
parse the bitstream to locate the digitized voice segment;
adjust compression of the bitstream containing the digitized voice segment to enhance audio quality of the bitstream;
analyze the speech file to convert the speech file into text and extract a set of keywords from the converted text;
determine one or more computer software applications accessible to the client computing device; and
select at least one of the computer software applications that include functionality responsive to the keywords, comprising:
generating, using a sequenced bag-of-words processing model, an input vector comprising a sequence of numeric values, each value associated with a keyword and weighted according to a relative position of the keyword in the set of keywords,
matching, using a K-Nearest Neighbor processing model, the input vector against a predefined set of vectors to determine one or more vectors that are similar to the input vector,
identifying a label corresponding to each matched vector, wherein the label is associated with computer software functionality, and
selecting one or more computer software applications that are associated with a most common label of the identified labels; and
a client computing device coupled to the server computing device, the client computing device configured to
display the extracted keywords in a user interface of a display device; and
execute the functionality of the selected computer software applications that is responsive to the keywords.

11. The system of claim 10, wherein when matching the input vector, the server computing device is configured to
determine a distance between the input vector and each vector in the predefined set of vectors; and
choose one or more of vectors in the predefined set of vectors where the distance is within a predetermined threshold.

12. The system of claim 10, wherein the label is an identifier that corresponds to a computer software application.

13. The system of claim 10, wherein the server computing device is configured to establish a voice connection between the remote device and the client computing device before capturing the digitized voice segment.

14. The system of claim 10, wherein the server computing device is configured to establish a voice connection between the remote device and an interactive voice response system before capturing the digitized voice segment.

15. The system of claim 10, wherein the server computing device is configured to display one or more user interface elements in the user interface that correspond to the executed functionality of the selected software applications.

16. The system of claim 10, wherein extracting a set of keywords from the converted text comprises filtering the converted text to remove stopwords.

17. The system of claim 10, wherein converting the digitized voice segment into text comprises executing a speech recognition engine on a digital file containing the digitized voice segment to generate the text.

18. The system of claim 17, wherein the server computing device is configured to analyze the text using a grammar recognition engine to validate the generated text.

19. A computer program product, tangibly embodied in a non-transitory computer readable storage device, for automated execution of computer software using intelligent speech recognition techniques, the computer program product including instructions operable to cause
a server computing device to
capture a bitstream containing a digitized voice segment from a remote device as a speech file, the digitized voice segment corresponding to speech submitted by a user of the remote device during a voice call;
parse the bitstream to locate the digitized voice segment;
adjust compression of the bitstream containing the digitized voice segment to enhance audio quality of the bitstream;
analyze the speech file to convert the speech file into text and extract a set of keywords from the converted text;
determine one or more computer software applications accessible to the client computing device; and
select at least one of the computer software applications that include functionality responsive to the keywords, comprising:
generating, using a sequenced bag-of-words processing model, an input vector comprising a sequence of numeric values, each value associated with a keyword and weighted according to a relative position of the keyword in the set of keywords,
matching, using a K-Nearest Neighbor processing model, the input vector against a predefined set of vectors to determine one or more vectors that are similar to the input vector,
identifying a label corresponding to each matched vector, wherein the label is associated with computer software functionality, and
selecting one or more computer software applications that are associated with a most common label of the identified labels; and
the computer program product instructions operable to cause a client computing device coupled to the server computing device to
display the extracted keywords in a user interface of a display device; and
execute the functionality of the selected computer software applications that is responsive to the keywords.

20. The method of claim 1, wherein the predefined set of vectors is generated by a CPU/GPU hardware module of the server computing device by:
(a) mapping input $x \in [0, 1]^d$ to a hidden representation $y \in [0, 1]^{d'}$, through a deterministic mapping;
(b) decode the hidden representation y into a reconstruction $$z = s(W'y + b')$$

(c) define a cost function $$L_H(x,z) = \|x-z\|^2;$$

(d) determine a minimal value of the cost function using a gradient descent $$\theta \leftarrow \theta - l\frac{\partial L_H(x, z)}{\partial x};$$

(e) convert each x to x' by using x'=s(Wx+b); and
(f) cluster x' using K-means clustering to generate the predefined set of vectors.

* * * * *